Patented Mar. 26, 1946

2,397,402

UNITED STATES PATENT OFFICE 2,397,402

COCOA MANUFACTURE

Leon C. Benedict, Mansfield, Mass., assignor to United-Rexall Drug Company, a corporation of Delaware No Drawing. Application August 27, 1943, Serial No. 500,273

7 Claims. (Cl. 99—23)

This invention relates to cocoa manufacture and more particularly to the processing of cocoa beans in the manufacture of cocoa.

Among the objects of this invention are the provision of a new method for the manufacture of cocoa; a new method for the preparation of a cocoa which is particularly suitable for the subsequent preparation of chocolate syrup; the preparation of cocoa which is more soluble in water than other cocoa powders; the provision of cocoa from which chocolate syrup having a new and desirable flavor may be prepared; and a method for the manufacture of cocoa which may be easily and conveniently carried out from inexpensive materials. Other objects will be in part apparent and in part pointed out hereinafter.

The invention accordingly comprises the ingredients and combinations of ingredients, the proportions thereof, steps and sequence of steps, and features of composition and manipulation, which will be exemplified in the products and methods hereinafter described, and the scope of the application of which will be indicated in the following claims.

According to the present invention, cocoa beans are treated by a two step process concurrently with the roasting operation. The cocoa beans are first treated with acid and part of the roasting process carried out, the acid is then neutralized and the roasting operation is completed. The finished cocoa made in accordance with the present invention is eminently suited for the manufacture of chocolate syrup or other cocoa products. The resulting chocolate syrup has an improved and desirable flavor not obtained when the cocoa beans are subjected to conventional roasting processes during manufacture.

The cocoa beans are preferably given first a short preheating treatment in order to loosen the shell and make its removal relatively easy. The shell is then removed along with the cocoa germ, and the beans are then treated in accordance with the present invention.

This preheating step is a very light roast and is carried only to the extent where the shell of the cocoa bean is loosened and can be removed by passing the beans through the usual cracking and fanning machine. The shell and cocoa germ are removed by this operation.

The following example illustrates the present invention.

A blend of 500 pounds of Para beans, 200 pounds of R. S. Arriba beans and 200 pounds of Trinidad beans, is given a very light roast, as described above. The roast is carried far enough so that the shell can easily be removed. The roasted beans are then passed through the cracking and fanning machine to remove the shell and cocoa germ.

The beans are then placed in a roaster and the roaster is started. Approximately 2½ pounds (1%) of concentrated hydrochloric acid (37%) dissolved in eight pails (about 30 gallons) of tap water are gradually added. The heat is then turned on the roaster and the roasting process is carried to a point where most of the moisture has been removed, that is, the mass of beans is quite moist to the touch. At this point a solution of 25 pounds of sodium bicarbonate in eight pails of lukewarm water is added to the bean mass in the roaster. The heat is then gradually raised and the roasting process carried to completion, giving what is known as a "medium roast."

The roasted beans are removed from the roaster and processed in the usual manner for the production of a cocoa powder. The pH of the finished cocoa is approximately 7.4.

Chocolate syrup prepared from the finished cocoa has a novel and desirable flavor. This flavor is not obtained with cocoa prepared in the usual way. In addition the cocoa has an unusually high solubility in water.

A mixture of beans is employed in the specific example but any single type of cocoa bean may be processed in accordance with the present invention and used as a single unit or may be blended with one or more other types of beans processed either in accordance with the present invention or in other ways, to make a cocoa powder.

Other acids may be substituted for the hydrochloric acid within certain limits. The salt formed by the neutralization of the acid, sodium chloride in the specific example, remains in the finished product so an acid should not be used which forms an undesirable salt. Sulfuric acid is not suitable for this reason, although phosphoric and many organic acids may be employed where the salt formed is not objectionable in the finished product. Nitric acid or other oxidizing agents should be avoided. Within the foregoing limitations, a rather wide choice of acids is possible; the salt in every case should be reasonably water soluble and completely non-toxic. If desired, the proper materials may be selected to form during the reaction a salt having a therapeutic effect.

The proportion of acid and beans in the specific example may be varied substantially although, since the salt formed by neutralizing the acid is a desirable component of the finished cocoa, the acid should preferably not be reduced below approximately two pounds for the proportions disclosed above. The preferred limits for acid are from two to three pounds of 37% hydrochloric, or an equivalent amount of another suitable acid, for 900 pounds of beans.

The volume of the acid solution should be sufficiently large to insure an even distribution of the acid throughout the beans. On the other hand, a large excess of water is preferably avoided since this increases the time required for evaporation. The water in which the concentrated hydrochloric acid is dissolved is preferably held between 25 and 35 gallons for the quantity of beans in the specific example.

Other neutralizing agents may be employed in lieu of sodium bicarbonate provided a reasonably water soluble non-toxic salt is formed thereby. For example, potassium or ammonium bases may be utilized. The proportion of acid to alkali may be altered but should not be changed enough to appreciably affect the pH value of the finished product. This pH is preferably maintained between 7.2 and 7.6. The proportion of acid and base to beans is preferably adjusted so that between one and two pounds of the salt are formed during the treatment of 900 pounds of beans.

In view of the above, it will be seen that the several objects of the invention are achieved and other advantageous results attained.

As many changes could be made in the above methods and products without departing from the scope of the invention, it is intended that all matter contained in the above description shall be interpreted as illustrative and not in a limiting sense.

I claim:

1. The method of treating cocoa beans which comprises acidulating the beans, roasting the beans and then neutralizing the acid and further roasting the beans, the acid and neutralizing agent reacting to form a water soluble-non-toxic product.

2. The method of manufacturing cocoa which comprises removing the shell of the cocoa bean, acidulating the beans, roasting the acidulated beans, neutralizing the acidulated beans and further roasting the neutralized beans, the acid and neutralizing agent reacting to form a water soluble, non-toxic product.

3. The method which comprises removing the shell from cocoa beans, mixing the beans with a dilute solution of hydrochloric acid, roasting the acidulated beans, neutralizing the acid with a dilute solution of an alkali metal base, and further roasting the neutralized beans.

4. The method which comprises removing the shell from cocoa beans, mixing the beans with a dilute aqueous solution of hydrochloric acid, roasting the beans, neutralizing the beans with a dilute aqueous solution of sodium bicarbonate, and further roasting the neutralized beans.

5. The method which comprises removing the shell from cocoa beans, mixing the beans with approximately .2% to .3% of their weight of 37% hydrochloric acid diluted with water, roasting the acidulated beans, neutralizing the acid with a dilute solution of an alkali metal base, and further roasting the neutralized beans, the final product having a pH of approximately 7.2 to 7.6.

6. Cocoa containing sodium chloride, a substantial portion of which is retained in the cocoa in a ratio of not substantially in excess of one per cent by weight, said cocoa having a pH between approximately 7.2 and 7.6.

7. Cocoa containing sodium chloride, a substantial portion of which is formed in situ and is retained in the cocoa in a ratio of not substantially in excess of one per cent by weight.

LEON C. BENEDICT.